United States Patent [19]

Nishimura

[11] 4,290,325
[45] Sep. 22, 1981

[54] APPARATUS FOR CONTROL OF OIL PRESSURE OPERATED TYPE TRANSMISSION FOR VEHICLE

[75] Inventor: Sadanori Nishimura, Omiya, Japan

[73] Assignee: Honda Giken Kogyo Kabushiki Kaisha, Tokyo, Japan

[21] Appl. No.: 39,731

[22] Filed: May 16, 1979

[30] Foreign Application Priority Data

May 29, 1978 [JP] Japan .................................. 53-63357

[51] Int. Cl.³ ........................ B60K 41/06; B60K 41/10
[52] U.S. Cl. ........................................ 74/869; 74/867; 74/878
[58] Field of Search ............. 74/867, 868, 869, 752 C, 74/878, 865

[56] References Cited

U.S. PATENT DOCUMENTS

| | | | |
|---|---|---|---|
| 3,164,035 | 1/1965 | Ellis et al. ...................... | 74/752 C X |
| 3,183,742 | 5/1965 | Ellis et al. ...................... | 74/752 C X |
| 3,572,179 | 3/1971 | Akima et al. ........................... | 74/869 |
| 3,651,714 | 3/1972 | Ohya et al. ......................... | 74/869 X |
| 3,747,439 | 7/1973 | Uozumi et al. ...................... | 74/869 |
| 3,782,216 | 1/1974 | Sakai ................................. | 74/869 X |

OTHER PUBLICATIONS

Civic 1500 4 Door/Civic CVCC 13 pages.

Primary Examiner—Leslie Braun
Attorney, Agent, or Firm—Haseltine and Lake

[57] ABSTRACT

An apparatus for controlling an oil-pressure-operated transmission for a vehicle, with a transmission having at least two forward speeds driven by oil pressure clutches, a reverse speed using one of these clutches, and a selector for shifting from forward speed to reverse to engage any of the forward and reverse trains. A manual valve is placed in the transmission hydraulic circuit so that when the manual valve is in automatic shift range on the forward running side, the selector is shifted to its forward running side and the oil pressure clutches in the forward driving trains receive pressure oil from an oil pressure source through a shift valve. When the manual valve is in its reverse position, the selector is shifted to its reverse side and oil is ported to the oil pressure clutch used jointly by the forward and reverse driving trains. The manual valve is located in an oil passage between the shift valve and the jointly used oil pressure clutch. When in automatic shift range, the oil passage is connected, but when in the reverse range, the oil passage is disconnected. At the same time, a downstream portion of the oil passage connected to the oil pressure clutch is connected to the oil pressure source without oil passing through the shift valve.

3 Claims, 7 Drawing Figures

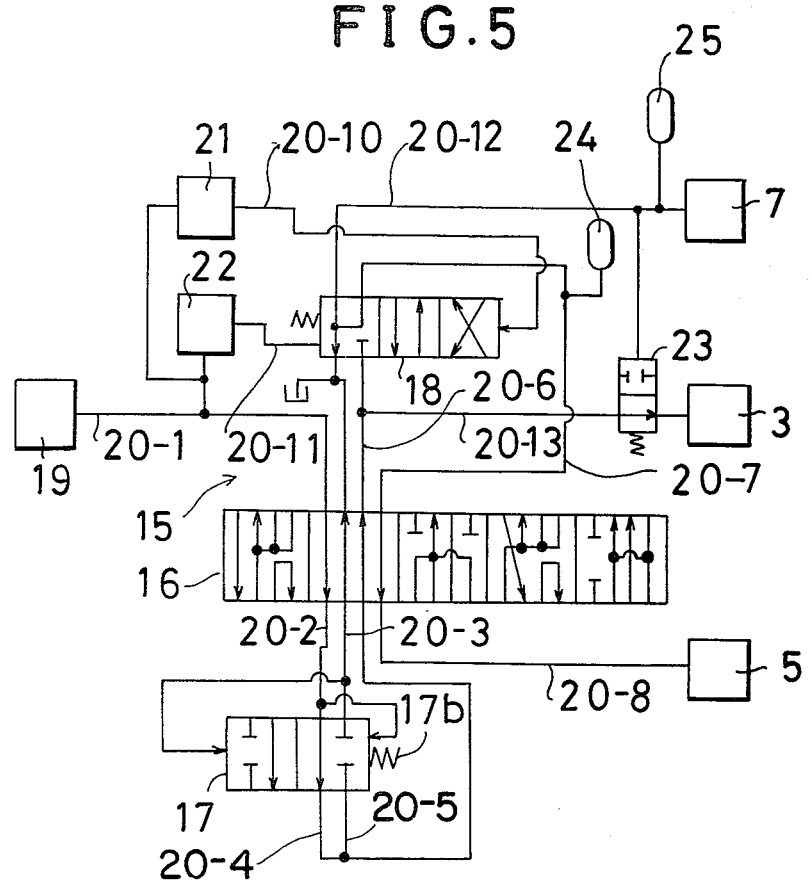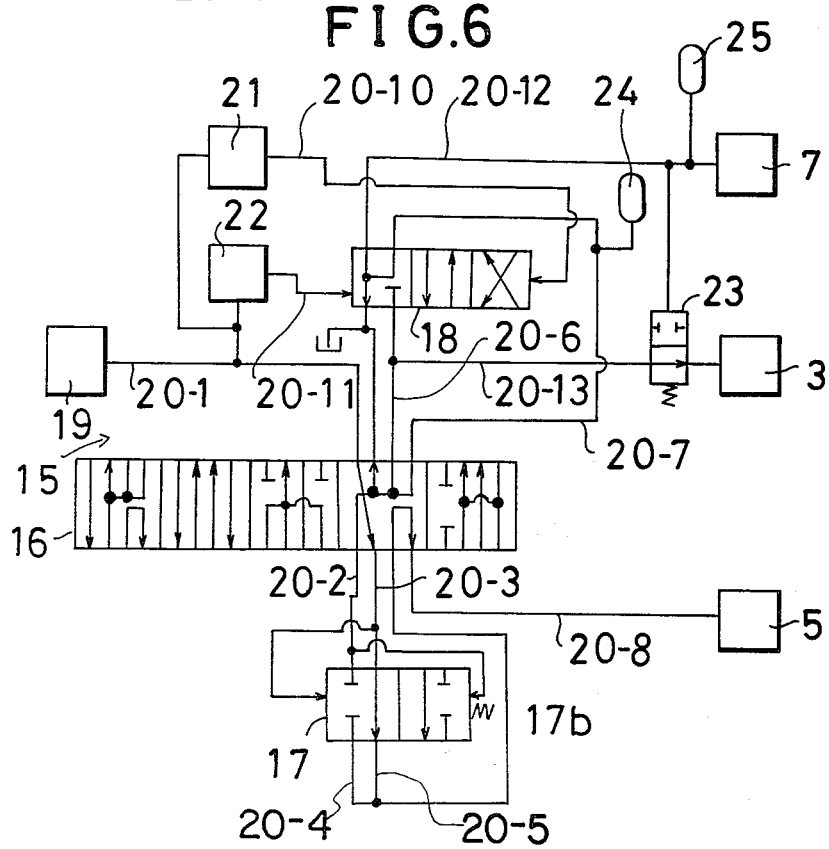

APPARATUS FOR CONTROL OF OIL PRESSURE OPERATED TYPE TRANSMISSION FOR VEHICLE

BACKGROUND OF THE INVENTION

This invention relates to an apparatus for control of an oil-pressure-operated transmission used for a vehicle such as a motorcar or the like.

As for the apparatus of this kind, there has been known a type of apparatus with a transmission provided with at least two-speeds forward driving trains having respective oil pressure clutches interposed therein, a backward driving train in which one of the oil pressure clutches used in the forward driving trains is used also for decreasing the size of the apparatus, and a selector arranged to be given changeover movements between its forward running side and its reverse running side for selectively establishing either the one of the forward driving trains or the reverse driving train, and a manual valve is interposed in an operation circuit of the transmission so that when the manual valve is in its automatic shift range on its forward running side, the selector is given a changeover movement to its forward running side and the respective oil pressure clutches in the forward driving trains are receiving the pressure oil from an oil pressure source through a shift valve, whereby there is effected a forward running of the vehicle at a predetermined gear by one or the other of the two forward driving trains according to a changeover movement of the shift valve corresponding to a vehicle speed and a throttle open degree, and when the manual valve is in its backward running range, the selector is given a changeover movement to its backward running side and the oil pressure clutch for common use is receiving pressure oil, causing a backward running of the vehicle by the reverse driving train. With this conventional apparatus, it has been usual, that the supply of the pressure oil to the oil pressure clutch for common use in the backward running range may be effected through the shift valve as shown, for instance, in FIG. 1. This conventional arrangement, however, has a connected defect that if the shift valve a is locked due to dust contamination or the like at such a position, for instance, that a pressure oil supply passage b, in the automatic shift range, is in connection with any of oil passages c′ and d′ respectively connected to the oil pressure clutch for common use c and the other oil pressure clutch d, it is possible to connect a pressure oil supply passage e, in the backward running range, with the oil passage c′ connected to the common use oil pressure clutch c, and consequently there cannot be achieved a reverse running of the vehicle.

SUMMARY OF THE INVENTION

The object of this invention is to provide an apparatus free from the foregoing defect, and in such an apparatus that a transmission is provided with at least two-speeds of forward driving trains having respective oil pressure clutches interposed therein, a reverse driving train for using also one of the two oil pressure clutches in the forward driving trains, and a selector arranged to be given changeover movements between its forward running side and its reverse running side for establishing selectively either the one of the forward driving trains or the reverse driving train, and a manual valve is interposed in an operation circuit of the transmission so that when it is in its automatic shift range on its forward running side, the selector is given a changeover movement to its forward running side and the respective oil pressure clutches in the forward driving trains are receiving the pressure oil from an oil pressure source through a shift valve, and when the same is in its reverse running side, the selector is given a changeover movement to its reverse running side and the oil pressure clutch for common use is receiving the pressure oil. The manual valve is interposed in an oil passage connecting the shift valve and the oil pressure clutch for common use is constructed such that when it is in its automatic shift range, the oil passage is connected, but when in its reverse running range, the oil passage is disconnected and a downstream passage of the oil passage connected to the oil pressure clutch for common use is connected with the oil pressure source without oil passing through the shift valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 5 to 7 are the circuit diagrams thereof, with the manual valve being in its D, R and L positions, respectively.

DESCRIPTION OF THE PREFERRED EMBODIMENTS

Figure 2:
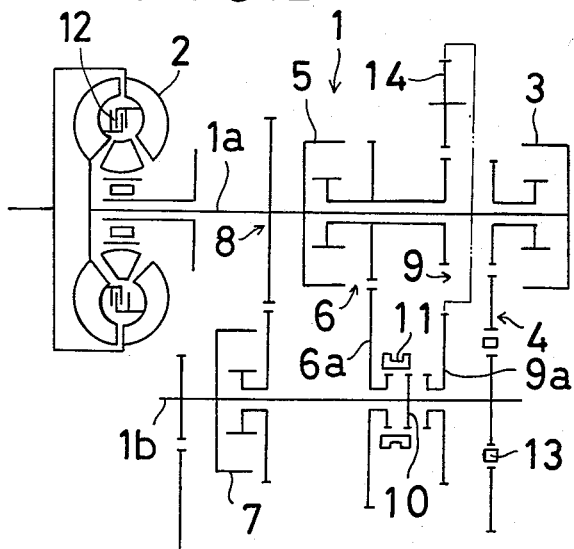
FIG. 2 is a diagram showing one example of a transmission having the apparatus in accordance with the invention.
Figure 4:
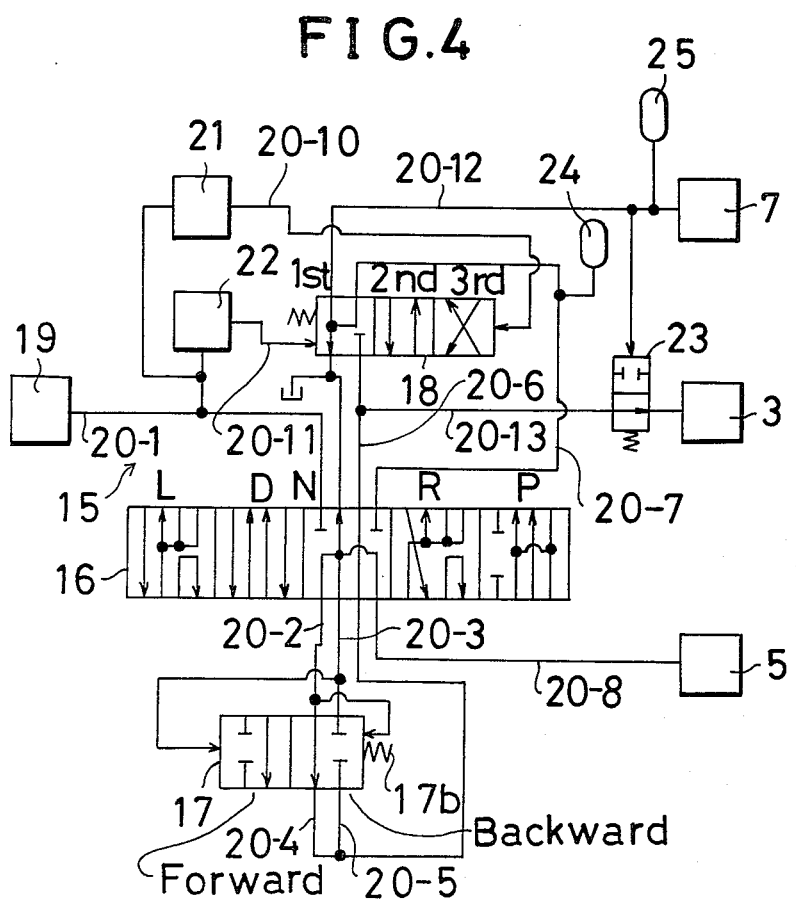
FIG. 4 is a circuit diagram thereof with a manual valve thereof being in its N position.
Figure 3:
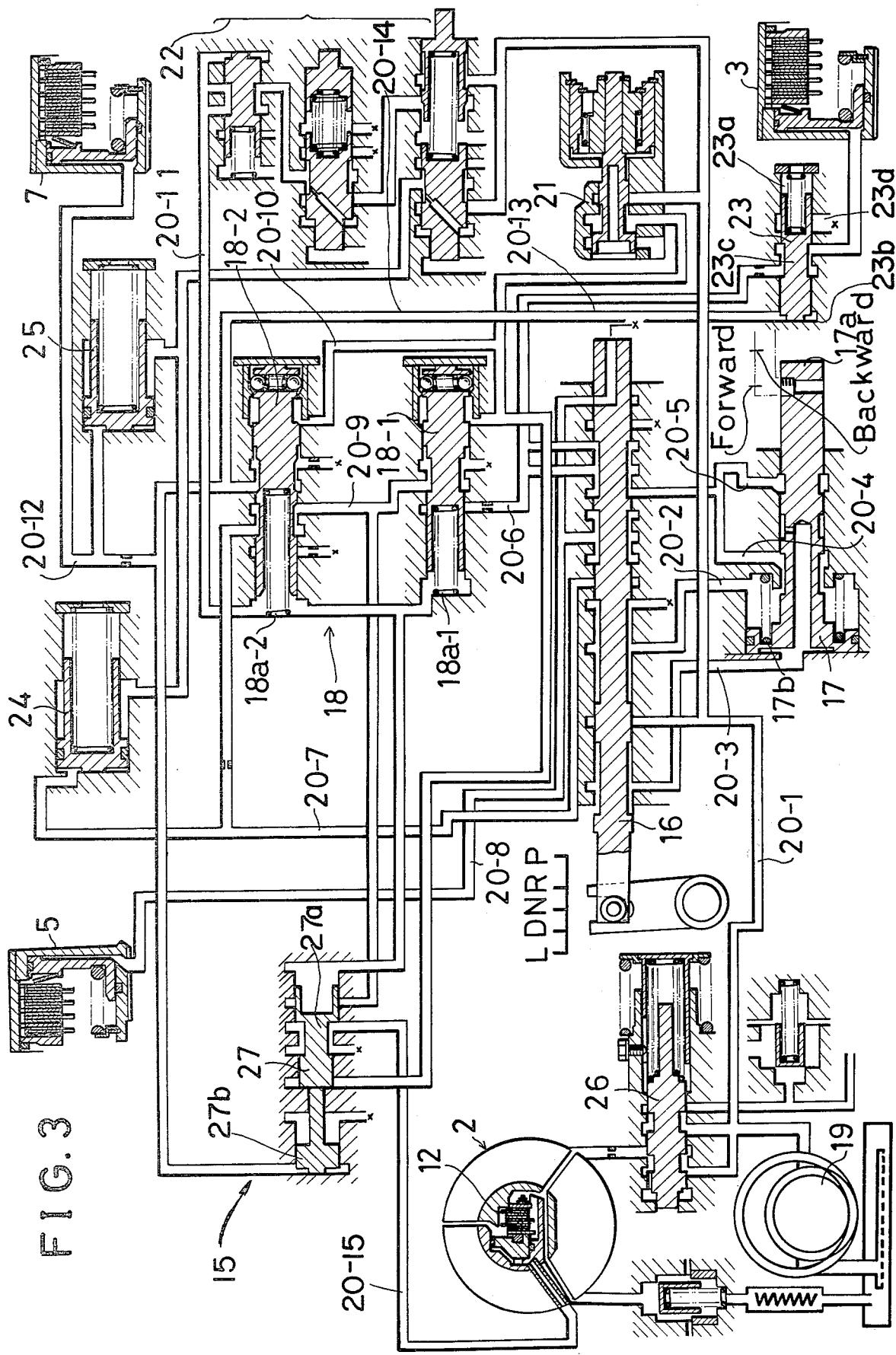
FIG. 3 is a diagram showing a construction of an operation circuit of one example of the apparatus according to the present invention.

Referring to FIG. 2, numeral 1 denotes a transmission with four gears of first, second, third and reverse, and the transmission 1 is provided with a 1st speed forward driving train 4 in which there is interposed a front oil pressure clutch 3 provided on an input shaft 1a connected through a torque convertor 2 to an internal combustion engine, a 2nd speed forward driving train 6 in which there is interposed a 2nd speed oil pressure clutch 5 provided on the input shaft 1a, a 3rd speed forward driving train 8 in which there is interposed a 3rd speed oil pressure clutch 7 provided on an output shaft 1b connected to a load such as wheels or the like, and a reverse driving train 9 which is provided in parallel with the 2nd speed forward driving train 6 in such a manner that the 2nd speed oil pressure clutch 5 is used also by the reverse driving train. The 2nd speed forward driving train 6 and the reverse driving train 9 are so arranged that they may be selectively established through a selector 11, which is arranged to be given changeover movements between a forward running side on the left in the same Figure and a reverse running side on the right in such a manner that idle gears 6a, 9a on their respective end portions are selectively connected to a gear 10 on the output shaft 1b.

Referring to the same Figure, numeral 12 denotes a direct coupling clutch built in the torque convertor 2, numeral 13 denotes a one-way clutch interposed in the 1st speed forward driving train 4 in order to cut off the power transmission through the 1st speed forward driving train 4 when the 2nd speed forward driving train 6 has been established, and numeral 14 denotes a reverse idle gear interposed in the backward driving train 9.

The oil pressure clutches 3, 5, 7 and the selector 11 are controlled in their operations by means of an operation circuit 15 as shown in FIGS. 3 to 7. The operation circuit 15 is provided with a manual valve 16 which can be changed over into five ranges comprising a hold range L, an automatic shift range D, a neutral range N, a reverse range R and a parking range P, and is also provided with a servo valve 17 for changing over between the forward running and the reverse running and having at its one end a connecting portion 17a for connecting the selector 11, and with a shift valve 18 which is arranged to be applied at its one end with a governor pressure substantially corresponding to a vehicle speed and at its other end with a throttle pressure substantially corresponding to the degree of throttle opening.

The manual valve 16 is so constructed as to control connecting relations between a 1st oil passage 20-1 connected to an oil pressure source 19, 2nd and 3rd oil passage 20-2, 20-3 which are connected to an inlet side of the servo valve 17, 4th and 5th oil passages 20-4, 20-5 which are connected to an outlet side of the same, a 6th oil passage 20-6 connected to an inlet side of the shift valve 18, a 7th oil passage 20-7 comprising an upstream passage of an oil passage connecting between the valve 18 and the 2nd speed oil pressure clutch 5, and an 8th oil passage 20-8 comprising a downstream passage of the same, and it is so intended that these oil passages 20-1, 20-2, ... 20-8 may be changed over and connected in the respective ranges of the manual valve 16, as described hereinafter.

The servo valve 17 is forced by a spring 17b to the left side, that is, to the forward position as to change over the selector 11 to its forward running side, and consequently in the D range and the L range of the manual valve 16 the same may serve to bring the 2nd oil passage 20-2 connected to the 1st oil passage 20-1 in its communication with the 4th oil passage 20-4, but in the R range of the manual valve 16 the same may shift to the right side, that is, to the backward position against the action of the spring 17b by the supplying of the pressure oil to the 3rd oil passage 20-3 connected to the 1st oil passage 20-1, and thus the selector 11 is given changeover movement to its rearward running side and a communication between the 3rd oil passage 20-3 and the 5th oil passage 20-5 may be given. In the illustrated embodiment, the 4th and the 5th oil passages 20-4, 20-5 are connected jointly to the manual valve 16, but it may be modified into that they are individually connected thereto.

The shift valve 18 comprises a 1st valve 18-1 for effecting a change of speed between the 1st speed and the 2nd speed and a second valve 18-2 for effecting a change of speed between the 2nd speed and the 3rd speed, and those valves are interconnected through an intermediate 9th oil passage 20-9, and these valves 18-1, 18-2 at their righthand ends have a governor pressure from a governor means 21 applied to them through a 10th oil passage 20-10 and at their left ends have applied resilient forces of respective springs 18a-1, 18a-2 and a throttle pressure from a throttle valve means 22 through a 11th oil passage 20-11, so that if a vehicle speed is increased, the 1st valve 18-1 is, firstly, given a slide movement from its right-hand sided 1st speed position to its left-hand sided 2nd speed position, whereby the 6th oil passage 20-6 is connected through the 9th oil passage 20-9 and the 2nd valve 18-2 to the 7th oil passage 20-7. Thereafter the 2nd valve 18-2 is given a slide movement from its right-hand sided 2nd speed position to its left-hand sided 3rd speed position, whereby the 9th oil passage 20-9 is connected to a 12th oil passage 20-12 connected to the 3rd speed oil pressure clutch 7. Further, the front oil pressure clutch 3 is arranged to be connected to the oil passage 20-6 through a 13th oil passage 20-13 in which there is interposed an opening and closing valve 23 arranged to be closed by supplying of the pressure oil to the 12th oil passage 20-12. Numerals 24, 25 denote accumulators serving as damper members interposed respectively in the 7th oil passage 20-7 and the 12th oil passage 20-12 so as to damp abrupt rising and lowering of supply pressure onto the 2nd speed and 3rd speed clutches 5, 7, numeral 26 denotes a regulator valve which serves to so control the pressure oil from the oil pressure source 19 as to be that of a pressure corresponding to a stator reaction force of the torque convertor 2 and supply the same to the torque convertor 2 and the 1st oil passage 20-1, and numeral 27 denotes a control valve for controlling supply of pressure oil to the direct coupling clutch 27.

Next, the operation of the apparatus will now be explained as follows:

In the D range of the manual valve 16 as shown clearly in FIG. 5, the 1st oil passage 20-1 is connected to the 2nd oil passage 20-2, and the 2nd oil passage 20-2 is connected to the 4th oil passage 20-4 through the servo valve 17 positioned at the forward running position, and the 4th oil passage 20-4 is connected to the 6th passage 20-6 through the manual valve 16, so that the front oil pressure clutch 3 is supplied with pressure oil through the 13th oil passage 20-13, whereby there is effected a forward driving of the vehicle at the 1st speed by the establishment of the 1st speed forward driving train 4. If, then, the vehicle speed is increased, the shift valve 18 is given a changeover movement to the 2nd speed position, so that the 6th oil passage 20-6 is connected to the 7th oil passage 20-7, and the 7th oil passage 20-7 is connected through the manual valve 16 to the 8th oil passage 20-8, whereby the 2nd speed oil pressure clutch 5 is supplied with the pressure oil. Thus, through the selector 11 previously changed over to the forward running side by the servo valve 17, the 2nd speed forward driving train 6 is established, and there is effected a forward driving of the vehicle at the 2nd speed. If the vehicle speed is further increased, the shift valve 18 is changed over to the 3rd speed position, whereby the 6th oil passage 20-6 is connected to the 12th oil passage 20-12, so that the 3rd speed forward driving train 8 is established by the supply of the pressure oil to the 3rd speed oil pressure clutch 7 and there is effected a forward driving of the vehicle at the 3rd speed. Abrupt rising and lowering of the supply pressure applied to the respective oil pressure clutches 5, 7 at the time of changeover operation of the shift valve 18 are damped by the respective damper members 24, 25, so that a change speed shock can be decreased.

At the time of the 1st speed, the front oil pressure clutch 3 is supplied with pressure oil through the opening and closing valve 23 which is opened by the 13th oil passage 20-13 and the spring 23a. When the shift valve 18 is shifted to the 2nd speed position, the front oil pressure clutch 3 is kept in its engaged condition. However, on this occasion, the one-way clutch 13 is released, so that it can be avoided that the 1st speed forward driving train 4 and the 2nd speed forward driving train 6 act to transmit power simultaneously. If the shift valve 18 is further shifted to the 3rd speed position, the 12th oil passage 20-12 is supplied with pressure oil. This pressure oil acts through the 14th oil passage 20-14 on the left end surface 23b of the opening and closing valve 23, and thereby the valve spool 23c is moved to the right against the action of the spring 23a. Thereby, the pressure oil acting on the front oil pressure clutch 3 is discharged through the discharging opening 23d. Accordingly, at the 3rd speed, the front oil pressure clutch 3 is released. The control valve 27 has the spool 27a and the plug 27b. The spool 27a is supplied on its both ends with the governor pressure through the 10th oil passage 20-10 and the throttle pressure through the 11th oil passage 20-11. The spool 27a is usually moved to the left by the throttle pressure and thereby the 15th oil passage 20-15 connected to the direct coupling clutch 12 is opened to an external air. On the other hand, the spool 27a is moved to the right by the governor pressure, so that the 15th oil passage 20-15 is in communication with the 9th oil passage 20-9. The plug 27b is acted on its one end by the pressure oil supplied through the 12th oil passage 20-12 to the 3rd speed oil pressure clutch 7, and at the time of operation thereof the pressure oil acts on the spool 27a in such a direction that the same assists the govenor pressure, whereby the spool 27a is moved to the righward limit position.

In the R range of the manual valve 16, as shown clearly in FIG. 6, the 1st oil passage 20-1 is connected to the 3rd oil passage 20-3, so that the servo valve 17 is given a slide movement to its reverse running position as mentioned before and accordingly the selector 11 is changed over to the reverse running side, and the 3rd oil passage 20-3 is connected to the 5th oil passage 20-5, and the 5th oil passage 20-5 is connected through the manual valve 16 to the 8th oil passage 20-8, whereby the reverse driving train 9 is established by the supply of the pressure oil to the 2nd speed oil pressure clutch 5 and there is effected a reverse driving of the vehicle.

Thus, in the R range, the 2nd speed oil pressure clutch 5 is supplied with the pressure oil without oil passing through the shift valve 18, so that the reverse driving can be effected even if the shift valve 18 is locked.

Further, in the course of changeover of the manual valve 16 from the R range to the D range and vice versa, the 8th oil passage 20-8 is open to the atmosphere in the N range of the manual valve 16, so that regardless of the existence of the damper member 24 connected to the 7th oil passage 20-7, the 2nd speed oil pressure clutch 5 can be immediately released from its coupling operation and power transmission to the idle gears 6a, 9a of the respective driving trains 6, 9 is cut off, whereby a changeover operation of the selector 11 between the reverse running side and the forward running side can be effected smoothly.

Figure 1:
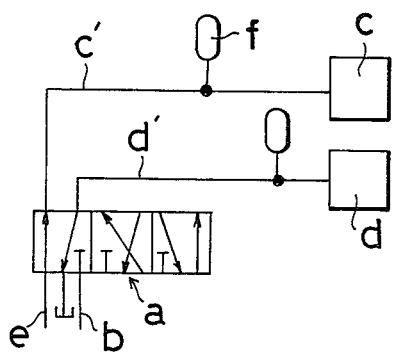
FIG. 1 is a circuit diagram showing a conventional example.

In this connection, the known conventional type apparatus FIG. 1 is such that the oil passage c' connecting the shift valve a and the common oil pressure clutch c is provided with a damper member f, such as an accumulator or the like connected thereto, so that in the N range the release of the coupling of the common use oil pressure clutch c is delayed, and thus a smooth changeover operation of the selector cannot be effected when the changeover of the manual valve from the R range to the D range and vice versa is carried out rapidly.

Figure 7:
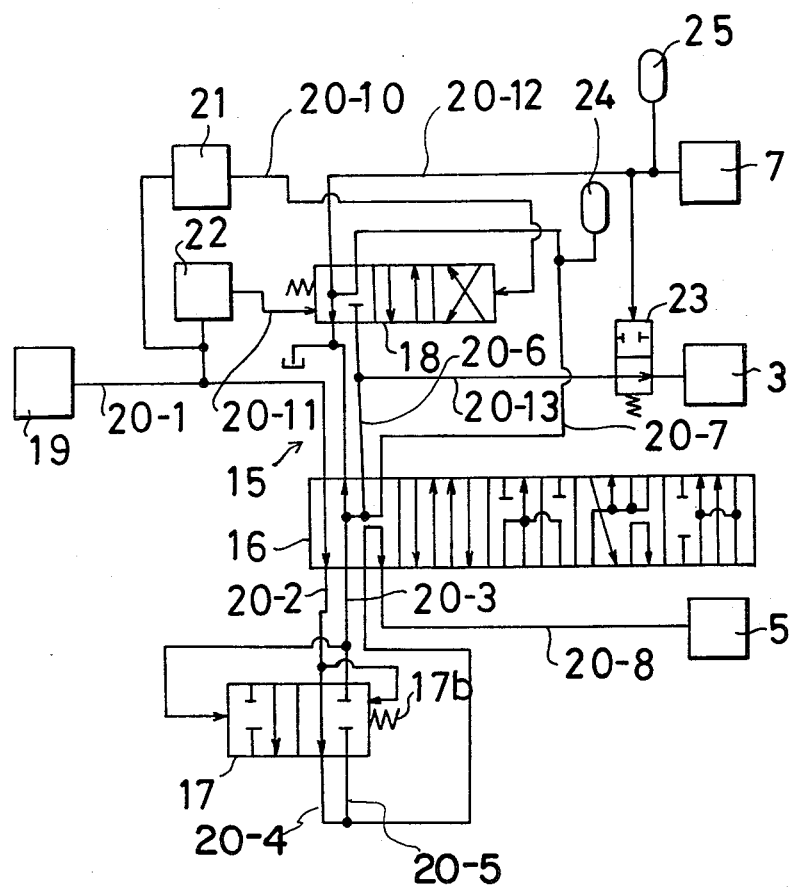

Furthermore, if the manual valve 16 is changed over from the D range to the L range in order to brake an engine, as shown clearly in FIG. 7, the first oil passage 20-1 is connected to the 2nd oil passage 20-2, and the 4th oil passage 20-4 which is connected to the 2nd oil passage 20-2 in the case where the servo valve 17 is at its forward running position is connected to the 8th oil passage 20-8, so that regardless of the existence of the damper member 24, the 2nd speed oil pressure clutch 5 can be immediately operated and thus a driving of the vehicle by the 2nd speed forward driving train 6 alone is effected. In this connection, the known conventional type apparatus is so defective that if from the condition where, in the D range, the oil pressure clutch d other than the common use oil pressure clutch c is in use, the changeover to the L range is carried out, even by supply of pressure oil to the oil passage c' rising in the supply pressure to the clutch c is delayed due to the existence of the damper member f, and thus an engine cannot be braked immediately.

The above has been explained about such an embodying example that the 2nd speed oil pressure clutch 5 is used in common with the reverse driving train 9, but this invention is not limited thereto and such a modification can be also considered that the front oil pressure clutch 3 is used in common with the train 9.

Thus, according to this invention, the manual valve is interposed in the oil passage connecting between the shift valve and the oil pressure clutch used in common, and it is so arranged that, in the automatic shift range of the manual valve, the upstream passage and the downstream passage of the oil passage are brought in communication one with another but in the reverse running range thereof the downstream passage is connected to the oil pressure source without oil passing through the shift valve, so that a reverse driving of the vehicle can be effected even if the shift valve is locked, and additionally the oil passage is separated into the two upstream and downstream passages, so that in the case when a damper member is intended to be provided, the same is connected to the upstream passage, so that predetermined operations of the common use oil pressure clutch in the respective ranges can be reliably obtained.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An apparatus for control of an oil pressure operated transmission for a vehicle comprising a transmission with at least two-speeds forward driving trains having respective oil pressure clutches interposed therein; a reverse driving train using one of said two oil pressure clutches used also in the forward driving trains; a selector arranged to be given changeover movements between a forward running side and a reverse running side for operating selectively either one of the forward driving trains or the reverse driving train; a manual valve interposed in an operation circuit of the transmission so that when the manual valve is in its automatic shift range on its forward running side, the selector is given a changeover movement to its forward running side and at the same time the respective oil pressure clutches in said forward driving trains are receiving pressure oil from an oil pressure source through a shift valve; the selector is given a changeover movement to its reverse running side and said oil pressure clutch for common use is receiving pressure oil when the manual valve is in its reverse running range; said manual valve being interposed in an oil passage connecting said shift valve and said oil pressure clutch for common use being constructed such that when the same is in the automatic shift range, said oil passage is connected, but when the same is in the reverse running range, said oil passage is disconnected and at the same time a downstream passage of said oil passage connected to said oil pressure clutch for common use is in communication with the oil pressure source without oil passing through the shift valve.

2. An apparatus as claimed in claim 1, wherein an upstream passage of the oil passage connected to the shift valve comprises damper means for damping abrupt rising and lowering of the supply pressure onto the oil pressure clutch for common use; said manual valve being arranged such that when positioned at its neutral range between the automatic shift range and the reverse running range, said downstream passage is open to the atmosphere.

3. An apparatus as claimed in claim 2, wherein said manual valve is arranged such that when positioned at its hold range on its forward side provided in addition to the automatic shift range and the selector is changed over to its forward running side, said downstream passage is in communication with said oil pressure source without oil passing through the shift valve.

* * * * *